United States Patent [19]

Bonnaud et al.

[11] 4,119,601

[45] Oct. 10, 1978

[54] PULVERULENT COMPOSITIONS BASED ON VINYL CHLORIDE

[75] Inventors: Bernard Bonnaud, Sisteron; Yves Fagnoni, Vienne, both of France

[73] Assignee: Rhone-Poulenc Industries, Paris, France

[21] Appl. No.: 748,517

[22] Filed: Dec. 8, 1976

[30] Foreign Application Priority Data

Dec. 11, 1975 [FR] France ............................... 75 37921

[51] Int. Cl.² .............................................. C08L 27/06
[52] U.S. Cl. ............................ 260/29.6 R; 260/17 R; 260/23 XA; 260/28.5 D; 260/30.6 R; 260/31.6; 260/31.8 R; 260/34.2; 260/42.49; 260/42.55; 260/45.7 R; 260/45.85 R
[58] Field of Search ................ 260/17 R, 260/23 XA, 28.5 D, 29.6 RB, 34.2; 526/1, 2, 3, 4, 5, 6

[56] References Cited

U.S. PATENT DOCUMENTS 3,898,189  8/1975  Bonnaud et al. ................. 260/17 R

*Primary Examiner*—Lewis T. Jacobs
*Attorney, Agent, or Firm*—McDougall, Hersh & Scott

[57] ABSTRACT

Method of preparing pulverulent polymer or copolymer compositions based on vinyl chloride and suitable for immediate use comprising preparing a master mixture of said polymers and/or copolymers based on vinyl chloride and additives employed therewith in use by mixing in an aqueous medium one or more of said polymers and/or copolymers and said additives in the form of liquid additives and/or fusible solid additives, the liquid additives and at least part of the fusible solid additives being introduced with agitation in the form of one or more dispersions of finely divided particles of a homogeneous phase in water, and mixing the master mixture with the remainder of the polymer and/or copolymers based on vinyl chloride.

15 Claims, No Drawings

PULVERULENT COMPOSITIONS BASED ON VINYL CHLORIDE

This invention relates to the preparation of pulverulent polymers and copolymers of vinyl chloride.

In american U.S. Pat. No. 3,898,189, description is made of a method for preparing pulverulent compositions of polymers and copolymers based on vinyl chloride suitable for direct use, in which there are mixed, in an aqueous medium, the polymers and copolymes based on vinyl chloride and various additives such as stabilizers, plasticizers, lubricants, pigments, colorants, fillers, polymer modifying agents, after which said compositions are separated from the aqueous medium and dried. In this method, the liquid additives and at least a part of the fusible solid additives are introduced, with continued agitation, into the mixing zone in the form of at least one finely divided aqueous dispersion of a homogeneous phase.

It has now been found that it is possible, by this method, starting from the same ingredients, to prepare pulverulent compositions of polymers and copolymers based on vinyl chloride which are usable as master mixtures. For this purpose, use is made of only a fraction of the polymers and copolymers intended for preparation of the pulverulent compositions directly suitable for use.

According to one aspect of the invention, there is provided a method of preparing pulverulent polymer or copolymer compositions based on vinyl chloride and suitable for immediate use in which there is prepared a master mixture by mixing, in an aqueous medium, one or more polymers and/or copolymers based on vinyl chloride and the various additives necessary for their use including, liquid additives and fusible solid additives, the liquid additives and at least a part of the fusible solid additives being introduced with agitation into the mixing zone in the form of one or more dispersions of finely divided particles of a homogeneous phase in water, and the master mixture thus obtained is thereafter mixed with polymers and/or copolymers based on vinyl chloride.

The proportion of polymers and/or the copolymers based on vinyl chloride used for the preparation of master mixture may be from 40 to 90% and preferably from 60 to 80% by weight of the master mixture.

By mixing of a master mixture and polymers and/or copolymers based on vinyl chloride, identical to or different from those used for preparation of the master mixture, there is obtained a pulverulent composition suitable for immediate use. The amount of master mixture used in the preparation of such a composition should be at least 10% and preferably between 20 and 60% by weight of the final composition.

The polymers and copolymers based on vinyl chloride used for the preparation of the master mixture may be prepared by any known process: bulk polymerization, suspension polymerization, polymerization in fine suspension or emulsion polymerization. The same applies to polymers and copolymers based on vinyl chloride intended to be mixed with master mixtures to obtain compositions suitable for immediate use.

The master mixture may contain polymer modifying agents such as polymethyl methacrylates; graft polymers and copolymers such as styrene and acrylonitrile on polybutadiene or styrene-butadiene copolymer, styrene and methyl methacrylates or polybutadiene or styrene-butadiene copolymer, butadiene and acrylonitrile on vinyl chloride polymer or copolymer, vinyl chloride on ethylene-vinyl acetate copolymer; copolymers of olefins and vinyl monomers such as copolymers of ethylene and vinyl acetate. The quantity of polymer modifying agent may range from 0 to 30 parts by weight per 100 parts by weight of polymers and copolymers based on vinyl chloride.

The liquid additives may be pure liquid ingredients or solutions of solid ingredients in appropriate solvents, such as plasticizers. Included in this category are stabilizers for polymers and copolymers based on vinyl chloride, such as organic tin salts, short chain metallic soaps; lubricants such as esters of glycerol and oleic acid, esters of glycerol and ricinoleic acid; antioxidants such as trinonylphenylphosphite; plasticizers such as dioctyl phthalate and epoxidized soya oil. The quantity of plasticizer used may range from 0 to 10 parts by weight per 100 parts by weight of polymer and copolymer based on vinyl chloride.

The solid fusible additives may be lubricants, such as wax esters, natural waxes, polyethylene waxes, paraffin waxes, fatty acids, fatty alcohols, amines of fatty acids and stabilizers, such as alphaphenylindole and calcium hydroxystearate.

Each of the liquid additives and the solid fusible additives may be introduced separately into the mixing zone in which the master mixture is made, such as in the form of a finely divided aqueous dispersion of a homogeneous phase. It is however generally preferable to make the introduction with a minimum number of aqueous dispersions, using a minimum number of homogeneous phases; this minimum number is a function of the reciprocal miscibility of said additives. There may be introduced into the mixing zone, in the form of the finely divided aqueous dispersion of a homogeneous phase, all the solid fusible additives capable of being brought into this form, that is to say capable either on their own or in mixture with at least one of the liquid additives or other solid fusible additives of allowing formation of a homogeneous phase.

The homogeneous phase may be formed by heating the additives at temperatures generally between 20° and 150° C. To make a finely divided aqueous dispersion of a homogeneous phase, it is sometimes advantageous first to make a predispersion of said phase in an aqueous solution of a dispersing agent which is chemically inert with respect to the additives to be dispersed, under strong agitation, at a temperature from 20° to 100° C., and then to pass this predispersion through a homogenizer, such as an ultrasonic or turbine homogenizer. As dispersing agents, use may be made of emulsifying agents which are non-ionic, such as alkylphenolpolyoxyethylenes, protective colloids such as methylcelluloses, polyvinyl alcohol, and the copolymers of maleic anhydride and styrene partially neutralized with potassium or sodium hydroxide. They may generally be used in an amount of 0.2 to 20% by weight with respect to the homogeneous phase to be dispersed. The concentration of the homogeneous phase in the aqueous dispersion may normally be from 10 to 40% by weight. The droplets of the homogeneous phase in the dispersion preferably have a mean diameter from 1 to 30 microns and most preferably between 10 and 20 microns. It may be advantageous continuously to prepare the aqueous dispersion of the homogeneous phase immediately before use to limit hydrolysis at high temperature, especially when hydrolyzable additives are present.

The solid ingredients, which are usable directly in the form of an aqueous dispersion such as for example the polymers and copolymers based on vinyl chloride and polymer modifying agents prepared in aqueous medium, are advantageously introduced in this form to the mixing zone.

The solid ingredients, which cannot be made into a homogeneous phase and which therefore are not directly usable in the form of an aqueous dispersion, may be added into the mixing zone either in the form of a concentrated pulverulent composition or as such possibly after wetting by means of an aqueous solution of a wetting agent.

The introduction in the form of a concentrated pulverulent composition is especially advantageous in the case when the ingredients are present in the form of particles having a wide distribution of grain size or of mean diameter generally greater than 40 microns. A concentrated composition of these ingredients in the form of particles having an average grain size close to that of the master mixture to be prepared, may be obtained by dry mixing under agitation at high speed and at a temperature generally from 50° to 130° C., in an amount 5 to 20 times their weight of the polymer or copolymer based on vinyl chloride. This category of additives includes lubricants, such as certain polyethylene waxes which, not being miscible with any of the liquid additives or other solid fusible additives and having a very high viscosity in the molten state, are difficult to bring into the form of a finely divided aqueous dispersion of a homogeneous phase. There is also advantage in introducing, in the form of concentrated compositions, ingredients in the form of very fine particles of diameter generally less than 4 microns, such as colorants, because they become firmly fixed to particles of polymers and copolymers and cannot be accidentally eliminated during later treatment.

Among the ingredients which are likely to be added as such there are certain solid pulverulent ingredients which are difficult to fuse, such as stabilizers and fillers and also the polymers and copolymers themselves and, in particular, those based on vinyl chloride.

Regarding the order of introduction of the ingredients into the mixing zone, several ramifications can be considered according to whether or not the polymers or copolymers are introduced in the form of a latex into the mixing zone and whether the latexes are composed of polymers or copolymers which are sticking or non-sticking.

In the case where none of the polymers and copolymers used are introduced in the form of a latex or in the case where all the polymers and copolymers used are introduced in the form of a latex, the addition of all the ingredients to the mixing zone, maintained under agitation, may be carried out by simultaneous or successive introductions in any order.

In the case where the polymers and copolymers used are introduced partly in the form of a latex certain precautions should be taken regarding the time of introduction of the latex depending on whether the latter are composed of polymers or copolymers which are sticking or non-sticking. The introduction in the mixing zone of a latex of sticking polymers or copolymers, hereinafter identified by the letter A, may be carried out before, during, or after the operation of mixing in the other ingredients but preferably before. On the other hand, the introduction of the latex of polymers or copolymers which are non-sticking, hereinafter identified by the letter B, should be carried out after the mixing operation for the other ingredients is finished, otherwise the composition will not be homogeneous.

The polymers or copolymers which are non-sticking are defined as polymers or copolymers which do not tend to agglomerate. By non-sticking polymer there is understood any polymer or copolymer of which the temperature of second order transition (vitreous transition Tg, according to R. F. Bayer, R. S. Spencer-Advances in Colloids Science 2-Interscience) is greater than 0° C., and preferably greater than 30° C. and of which the modulus of elasticity in stretching (Standard ASTM.D638-61T) is greater than 1000 kg/cm2 and preferably greater than 10000 kg/cm2.

As non-sticking polymers and copolymers there may be mentioned polyvinyl chloride; polymethylmethacrylates; graft polymers and copolymers such as styrene and acrylonitrile on polybutadiene or styrene-butadiene copolymer, styrene and methylmethacrylate on polybutadiene or styrene-butadiene copolymer, vinyl chloride on ethylene-vinyl acetate copolymer; copolymers of olefins and vinyl monomers such as copolymers of ethylene and vinyl acetate.

As sticking polymers there may be mentioned the polymers obtained by grafting, in emulsion, of a diene monomer possibly added to at least one vinyl monomer on a polymer or copolymer chain of vinyl chloride. This is the case, for example, with polymers obtained by grafting butadiene and acrylonitrile on polyvinyl chloride.

In order to avoid possible hydrolysis phenomena for certain additives, it may be advantageous to carry out the mixing in an aqueous medium adjusted to a pH close to 7, for example by addition of ammonia.

The operation of mixing may be carried out in a vessel, which may be an autoclave, which has been used for preparation of one of the polymers or copolymers intended for the preparation of the composition according to the invention.

In the case where at least parts of the polymers or copolymers used are not introduced in the form of a latex, but have been prepared by polymerization in aqueous suspension or in bulk and thus have the usual grain size for these types of resin, the concentration of dry matter in the aqueous medium is adjusted, if necessary, by addition of water and is generally between 20 and 40% and preferably 25 to 35% by weight. During the operation of mixing, the temperature of the aqueous medium may be maintained between 20° and 90° C. and preferably from 25° to 60° C., possibly by heating by means, for example, of injection of steam. In this case there is advantage in proceeding with the operation of mixing under agitation at high turbulence. It is believed that under the influence of repeated shocks, caused by such agitation, the particles in the aqueous dispersion of the homogeneous phase become fixed in an irreversible manner on the grains of polymers or copolymers prepared by polymerization in suspension or in bulk, as a consequence of which there is a large momentary thickening of the medium subjected to agitation. In this case it is also advantageous to introduce in the mixing zone the latex of polymers or copolymers only at this stage because the latter perturb the process of fixation described above and retard or suppress the resulting phenomenon of thickening. The addition of latex however puts an end to this thickening and returns the fluidity of the medium subjected to agitation to its original level. The end of the mixing operation may be detected by removing and optically examining, with a microscope, an aliquot of aqueous composition. This examination shows that when the operation is finished the particles obtained are formed of particles of polymer and copolymer prepared by polymerization in aqueous suspension or in bulk, on which are fixed the other particles with the exception however of a part of the particles forming the latex A which may be used. All other things being equal, the duration of the operation of mixing is in this case greater as the concentration of the aqueous medium in dry matter is lower, the agitation less violent and the temperature lower. By way of indication, this duration may vary from 2 minutes to 2 hours, depending on the operating conditions.

After finishing the operation of mixing, it is possible optionally after dilution, to coagulate by addition of a solution of a coagulating agent, the particles of latex A which are not already fixed on the particles of polymers and copolymers prepared by polymerization in aqueous suspension or in bulk or to add other latex A and proceed to its coagulation, or to introduce as the case requires latex B which is also coagulated by addition of a solution of a coagulating agent. The addition of other latexes A and latexes B in the aqueous medium may be carried out by simultaneous or successive introductions and in any order. It is also possible to proceed simultaneously or successively with their coagulation. However the last operation of coagulation concerns essentially the latexes B otherwise the particles obtained have a tendency toward sticking which causes their agglomeration during separation from the aqueous medium, also on storage and use of the final dried composition. On examination with a microscope, it is observed that during the successive coagulations, the particles of the different latices used are also fixed on the particles of polymers and copolymers prepared by polymerization in aqueous suspension or bulk.

The aqueous composition may then be subjected to heat treatment which consists of heating and agitating at a temperature from 60° to 100° C., such as by injection of steam, for a period of 2 to 60 minutes. The duration of this treatment may advantageously be reduced by operating continuously to limit possible hydrolysis. This thermal treatment, which facilitates the final elimination of the aqueous phase, also has the effect of causing the additives to penetrate to the inside of the particles of polymer and copolymer on which they are fixed and thus to perfect the mixing which becomes evident after separation of the liquid medium, as for example, by vacuum filtration and drying, to provide a homogeneous pulverulent composition which flows freely and which is usable as a master mixture. In the absence of heat treatment, the composition obtained may have the appearance of mud possessing poor flow properties.

In the case where all the polymers and copolymers used are introduced in the form of a latex, the concentration in the aqueous medium of dry matter, after introduction of the ingredients in the mixing zone, is generally from 15 to 45% by weight. The operation of mixing is practically instantaneous and completed at the end of introduction of the ingredients to the mixing zone. At this stage, all the particles used are intimately mixed but retain their individuality. It is possible, however, to submit the aqueous composition to an operation of atomization, generally between 55° and 110° C., after possible dilution, to coagulate the latex by addition of a solution of a coagulating agent, submit the aqueous composition to a heat treatment identical to that described in the case where at least a part of the polymers or copolymers used have been prepared by polymerization in aqueous suspension or in bulk, separate the composition of the liquid medium for example by vacuum filtration, followed by drying. There is then obtained a pulverulent homogeneous free-flowing composition usable as a master mixture.

It is often advantageous to use coagulation agents, such as calcium chloride, which do not substantially alter the pH of the aqueous medium which, in the case of use of hydrolyzable additives, should remain close to 7. They are generally used in the quantity of 0.2 to 5% by weight with respect to the polymers and copolymers forming the latex to be coagulated.

For the preparation of compositions suitable for immediate use, the master mixture and the polymers and/or copolymers based on vinyl chloride may be mixed in a dry state by fluidization or mechanically, for example by means of a mixer operating at slow speed or continuously by means of a dosing device which may be connected to a fabrication machine. In the case where the polymer and/or copolymer or polymers or copolymers based on vinyl chloride are prepared by polymerization in aqueous suspension, the master mixture and said polymers and/or copolymers may be mixed in aqueous medium in the form of their respective aqueous suspensions. In this case, that is either the master mixture on its own in the form of its aqueous suspension, or the final aqueous composition, may be subjected to the thermal treatment described above.

The pulverulent compositions of polymers and copolymers based on vinyl chloride, suitable for immediate use prepared from the master mixtures obtained by the method of the invention, are suitable for manufacture of rigid articles by molding, calendering, injection, extrusion, extrusion-blowing and especially for manufacture by extrusion blowing or hollow bodies, such as bottles suitable for containing food products, such as wine and mineral waters.

Embodiments of the invention will be illustrated by way of the following examples.

In Examples 1 to 10, there is used as vinyl chloride polymer for preparation of master mixtures, a polymer S prepared by polymerization in aqueous suspension. It is introduced into the mixing zone in the form of the aqueous suspension in which it is made containing 31% by weight polymer.

In Examples 1, 5, 8, and 9, plastic compositions suitable for immediate use are prepared by mixing in aqueous medium, in the form of their respective aqueous suspensions, of the master mixture and the polymer S.

In Examples 2, 3, 4, 6, 7, and 10, the compositions suitable for immediate use are prepared by mixing in the dry state the master mixture and polymer S or a polymer M prepared by bulk polymerization.

In Example 11 there is used, as polymer of vinyl chloride, for preparation of the master mixture, a polymer E prepared by polymerization in aqueous emulsion. It is introduced into the mixing zone in the form of the latex in which it was obtained containing 31% by weight of dry material.

In Example 11, the composition suitable for immediate use is prepared by mixing in the dry state of the master mixture and polymer E obtained by atomization of its latex.

The polymers S, M, and E are polyvinyl chlorides having an AFNOR viscosity index of 80, determined according to Standard NFT 51013.

EXAMPLE 1

In a vessel of 50 M³ capacity, provided with two helices of 2 m diameter, turning at 70 turns per minute, there are introeuced:

27 tons of the aqueous suspension of polymer S previously cooled to 35° C., 30 kg of micronized polyethylene wax, an aqueous dispersion of a homogeneous phase prepared in the following manner: in a melting vessel at 110° C., there is made, by heating of the ingredients forming it, a homogeneous phase composed of 1350 kg of epoxidized soya oil, 55 kg of zinc stearate, 80 kg of calcium stearate, 100 kg of alphaphenylindole and 540 kg of glycerol monostearate. This homogeneous phase is fed under violent agitation, obtained by means of a turbine of 200 mm diameter turning at 3000 revs. per minute, into 5 tons of an aqueous solution of 0.25% by weight of copolymer of maleic anhydride and styrene, partially neutralized by potassium hydroxide, said solution previously being heated to 85° C.

After 60 minutes agitation, it is found by microscopic examination that the mixing of the introduced ingredients has finished. There is then introduced into the vessel 6.7 tons of a latex having 40% by weight of dry material of a polymer obtained by grafting of styrene and methyl methacrylate on polybutadiene, then 1 ton of an aqueous solution of 5% by weight of calcium chloride.

The master mixture, thus obtained, is transferred during 5 hours into a vessel of 100 M³ capacity, provided with two superposed turbines having four inclined blades turning at 40 revs. per minute and containing 54 tons of the aqueous suspension of polymer S, previously cooled to 40° C. by means of an intermediate vessel of 5 M³ capacity, in which it is heated to 90° C. by injection of steam. The dwell time in this vessel is 30 minutes and the final temperature of the mixture obtained in the vessel of 100 M³ capacity is stabilized at about 60° C.

After filtering and drying of the aqueous composition thus prepared, there is obtained a pulverulent composition which flows freely.

It is found that the pulverulent composition obtained has a granulometric distribution close to that of polymer S. As a result, the operations of filtering and drying of the aqueous composition may be carried out in conventional industrial plant used for recovery of polymers of vinyl chloride prepared by polymerization in aqueous suspension.

The composition obtained is capable of being subjected, without further treatment, to subsequent fabricating operations such as molding, calendering, extrusion, blow molding, and injection, to give rigid shock resistant articles which are transparent and of color which is very slightly yellow.

EXAMPLE 2

The procedure of Example 1 is followed but the master mixture contained in the vessel of 50 M³ capacity is treated continuously for 5 hours by passage through two vessels of 5 M³ capacity in series, the first in which the master mixture is heated to 90° C. by injection of water vapor, the second provided with a jacket in which it is cooled to 60° C. by circulation of water in the jacket. The master mixture, thus treated, is filtered and dried. The master mixture, thus obtained, is recovered in a silo in which it is mixed by fluidization with 16.74 tons of polymer S or polymer M.

There is obtained a composition having the same properties as those obtained in Example 1.

EXAMPLE 3

The procedure of Example 2 is followed except that, after drying, the master mixture is mixed continuously with 16.74 tons of polymer S or polymer M by means of a screw operated metering device which is connected to feed a fabricating machine. The articles obtained have the same properties as those obtained from compositions prepared as in Examples 1 and 2.

EXAMPLE 4

The procedure of Example 2 is followed except that, after drying of the master mixture, there is mixed 132 kg of master mixture with 167 kg of polymer S or polymer M in a mixer at slow speed having a useful capacity of 600 liters. The duration of mixing is 30 minutes.

There is obtained a composition having the same properties as that obtained in Example 1.

EXAMPLE 5

In a vessel of 30 M³ capacity, provided with two helical stirrers 1.5 m in diameter turning at 80 rpm, there is introduced:

13.5 tons of aqueous suspension of polymer S previously cooled to 35° C., 30 kg of micronized polyethylene wax, an aqueous dispersion of a homogeneous phase prepared as in Example 1.

After 30 minutes of agitation, it is found by microscopic examination that the mixing of the ingredients introduced is finished. There is then introduced into the vessel 6.7 tons of a latex having 40% by weight solids of a polymer obtained by grafting styrene and methyl methacrylate on polybutadiene, then 1 ton of an aqueous solution containing 5% by weight of calcium chloride.

The master mixture, thus obtained, is transferred in 5 hours into a vessel of 100 M³ capacity used in Example 1, in which the turbines rotate at 40 turns per minute, and containing 67.5 tons of the aqueous suspension of polymer S, previously cooled to 50° C., by means of an intermediate vessel of 3 M³ capacity in which it is heated at 90° C. by injection of steam. The dwell time in this intermediate vessel is 30 minutes and the final temperature of the mixture obtained in the vessel of 100 M³ capacity is stabilized at about 60° C.

After filtering and drying of the aqueous composition thus prepared, there is obtained a composition having the same properties as that obtained in Example 1.

EXAMPLE 6

In the vessel of 50 M³ capacity, described in Example 1, of which the helices turn at 70 turns per minute, there is introduced:

27 tons of the aqueous suspension of polymer S previously cooled to 35° C., an aqueous dispersion of a homogeneous phase prepared in the following manner: in a melting device at 100° C., there is made by heating of the ingredients, a homogeneous phase composed of 1000 kg of dioctyl tin bis-isooctyl-mercaptoacetate, 250 kg of oxidized polyethylene wax, 200 kg of glycerol trihydroxystearate and 25 kg of a blue colorant. Said homogeneous phase is fed under violent agitation, obtained by means of a turbine of 200 mm diameter turning at 3000 turns per minute, into 4 tons of an aqueous solution having 2% by weight of sodium dioctylsulpho-succinate, said solution previously being brought to 80° C.

After 60 minutes of agitation, it is found by microscopic examination, that the mixing of the ingredients introduced has finished. There is then introduced into the vessel 13 tons of a latex containing 40% dry weight of a polymer obtained by grafting of styrene and methyl methacrylate on polybutadiene, then 2 tons of an aqueous solution of 5% by weight calcium chloride.

The master mixture, thus obtained, is treated continuously for 5 hours by passage through two vessels of 5 $M^3$ capacity in series, the first in which the master mixture is heated to 90° C. by injection of steam, the second, provided with a jacket, in which it is cooled to 60° C. by circulation of water in the jacket. The master mixture thus treated is filtered and dried.

The master mixture thus obtained is fed to a silo in which it is mixed by fluidization with 60 tons of polymer S or polymer M.

There is obtained a free-flowing pulverulent composition capable of being used directly in fabrication machines to give rigid articles resistant to shock, highly transparent and with a slight blue color.

EXAMPLE 7

In a vessel of 40 $M^3$ capacity, provided with two helices of 1.80 m diameter turning at 75 turns per minute, there is introduced:

17 tones of the aqueous suspension of polymer S previously cooled to 35° C., an aqueous dispersion of a homogeneous phase prepared as in Example 6.

After 60 minutes of agitation, it is found by microscopic examination that the mixing of the introduced ingredients has terminated. There is then introduced into the vessel 13 tons of a latex having 40% dry weight of a polymer obtained by grafting styrene and methyl methacrylate on polybutadiene, then 2 tons of an aqueous solution containing 5% by weight of calcium chloride.

The master mixture, thus obtained, is treated continuously for 5 hours by passage through two vessels of 5 $M^3$ capacity in series, the first in which the master mixture is heated to 90° C. by injection of steam, the second, provided with a jacket, in which it is cooled to 60° C. by circulation of water in the jacket. The master mixture thus treated is filtered and dried.

The master mixture is collected in a silo in which it is mixed by fluidization with 63.1 tons of polymer S or polymer M.

There is obtained a composition having the same properties as that obtained in Example 6.

EXAMPLE 8

In a vessel of 50 $M^3$ capacity described in Example 1, in which the helices turn at 70 turns per minute, there is introduced:

27 tons of the aqueous suspension of polymer S previously cooled to 35° C., an aqueous dispersion of homogeneous phase prepared in the following manner: in a melting vessel at 110° C., there is made, by heating of the ingredients, a homogeneous phase composed of 200 kg of tin dioctyl bis-isooctyl-mercaptoacetate, 50 kg of oxidized polyethylene wax, 40 kg of glycerol trihydroxystearate and 5 kg of a blue colorant. Said homogeneous phase is fed under violent agitation, obtained by means of a turbine of 100 mm diameter turning at 6000 turns per minute, into 800 kg of an aqueous solution containing 2% by weight of sodium dioctylsulphosuccinate, said solution previously being heated at 80° C.

After 60 minutes of agitation, it is found by microscopic examination that the mixing of the ingredients introduced has finished. There is then introduced in the vessel 2.6 tons of a latex containing 40% dry weight of a polymer obtained by grafting styrene and methyl methacrylate on polybutadiene, then 400 kg of an aqueous solution containing 5% by weight of calcium chloride.

To the master mixture, thus obtained, there is added 17.11 tons of aqueous suspension of polymer S. The aqueous composition thus obtained is then treated continuously for 5 hours by passage through two vessels of 5 $M^3$ in series, the first in which the composition is heated at 90° C. by injection of steam, the second, provided with a jacket, in which it is cooled at 60° C. by circulation of water in the jacket. The composition thus treated is filtered and dried.

There is obtained a composition having the same properties as that obtained in Example 6.

EXAMPLE 9

In the vessel of 50 $M^3$ capacity, described in Example 1 of which the helices turn at 70 turns per minute, there is introduced:

36 tons of the aqueous suspension of polymer S previously cooled to 35° C., 15 kg of micronized polyethylene wax, an aqueous dispersion of a homogeneous phase prepared in the following manner: in a vessel for melting at 110° C., there is made by heating of the ingredients, a homogeneous phase composed of 675 kg of epoxidized soya oil, 27.5 kg of zinc stearate, 40 kg of calcium stearate, 50 kg of alphaphenylindole and 270 kg of glycerol monostearate. Said homogeneous phase is fed under violent agitation, obtained by means of a turbine of 150 mm diameter turning at 3000 turns per minute, into 2.5 tons of an aqueous solution of 0.25% by weight of a copolymer of maleic anhydride and styrene partially neutralized with potassium hydroxide, said solution previously being heated to 85° C.

After 60 minutes of agitation, it is found by microscopic examination that the mixing of the ingredients introduced has completed. There is then introduced in the vessel 3.35 tons of a latex of 40% dry weight of a polymer obtained by grafting of styrene and methyl methacrylate on polybutadiene, then 500 kg of an aqueous solution containing 5% by weight of calcium chloride.

To the master mixture, thus obtained, there is added 4.5 tons of the aqueous suspension polymer S. The aqueous composition thus obtained is then treated continuously for 5 hours by passage in two vessels of 5 $M^3$ capacity in series, the first in which the composition is heated to 90° C. by injection of steam, the second, provided with a jacket, in which it is cooled to 60° C. by circulation of water in the jacket. The composition thus treated is filtered and dried.

There is obtained a composition having the same properties as that obtained in Example 1.

EXAMPLE 10

In a vessel of 25 M³ capacity, provided with two helices of 1.20 m diameter turning at 90 turns per minute, there is introduced:

13.5 tons of aqueous suspension of polymer S previously cooled to 35° C., 150 kg of methyl polymethacrylate, 50 kg of micronized polyethylene wax, an aqueous dispersion of a homogeneous phase prepared in the following manner: in a melting vessel at 110° C. there is made by heating of the ingredients to form a homogeneous phase composed of 1500 kg of epoxidized soya oil, 75 kg of zinc stearate, 75 kg of calcium stearate, 100 kg of alph aphenylindole, 250 kg of glycerol monostearate and 50 kg of green coloring. Said homogeneous phase is fed under violent agitation, obtained by means of a turbine of 200 mm diameter turning at 3000 turns per minute, in 5 tons of an aqueous solution of 0.25% by weight copolymer of maleic anhydride and styrene partially neutralized by potassium hydroxide, said solution being previously brought to 85° C.

After 30 minutes agitation, it is found by microscopic examination, that the mixing of the ingredients introduced has finished.

The master mixture thus obtained is treated continuously for 5 hours by passage through two vessels of 2.5 M³ capacity in series, the first in which the master mixture is heated to 90° C. by injection of steam, the second, provided with a jacket, in which it is cooled to 60° C. by circulation of water in the jacket. Ths master mixture thus treated is filtered and dried.

The master mixture thus obtained is collected in a silo in which it is mixed by fluidization with 48 tons of polymer S or polymer M.

There is obtained a free-flowing pulverulent composition suitable for immediate use, especially suitable for manufacture by blow molding of bottles usable for containing mineral water.

EXAMPLE 11

In the vessel of 50 M³ capacity, described in Example 1 of which the helices turn at 20 turns per minute, there is introduced:

27 tons of latex of polymer E previously cooled to 35° C., 30 kg of micronized polyethylene wax, and an aqueous dispersion of a homogeneous phase prepared as in Example 1.

After 60 minutes agitation, it is found by examination under a microscope, that all the particles used are intimately mixed but retain their individuality. The aqueous composition is then subjected to atomization at 90° C.

There is collected a master mixture in a silo in which it is mixed, by fluidization, with 16.74 tons of polymer E.

There is obtained a free-flowing composition suitable for immediate use in fabrication machines to get articles which are rigid, transparent, and practically without color.

We claim:

1. Method of preparing pulverulent polymer or copolymer compositions based on vinyl chloride and suitable for immediate use comprising preparing a master mixture of said polymers and/or copolymers based on vinyl chloride and additives employed therewith in use by mixing in an aqueous medium a fraction of the one or more of said polymers and/or copolymers and said additives in the form of liquid additives and/or fusible solid additives, the liquid additives and at least part of the fusible solid additives being introduced with agitation in the form of one or more dispersions of finely divided particles of a homogenous phase in water, and mixing the master mixture with the remainder of the polymer and/or copolymers based on vinyl chloride.

2. The method as claimed in claim 1, in which the quantity of polymers and/or copolymers based on vinyl chloride in the master mixture is within the range of 40 to 90% by weight of the master mixture.

3. The method as claimed in claim 2, in which said quantity of polymers and/or copolymers is within the range of 60 to 80% by weight of the master mixture.

4. The method as claimed in claim 1, in which the quantity of master mixture in said pulverulent composition is at least 10% by weight of the pulverulent composition.

5. The method as claimed in claim 4, in which the quantity of master mixture in said pulverulent composition is within the range of 20 to 60% by weight of the pulverulent composition.

6. The method as claimed in claim 1, which includes the step of separating the aqueous medium and drying the master mixture, and mixing the dried master mixture with the remainder of the polymers and/or copolymers based on vinyl chloride in the dry state.

7. The method as claimed in claim 1, in which the polymers and/or copolymers based on vinyl chloride mixed with the master mixture are prepared by polymerization in aqueous suspension, mixing the master mixture and polymers and/or copolymers based on vinyl chloride in the form of their respective aqueous suspensions in which they are prepared, and separating and drying the polymeric composition thus obtained.

8. The method as claimed in claim 7, which includes the step of heating the master mixture suspension under agitation before mixing with the polymer and/or copolymer suspension.

9. The method as claimed in claim 7 which includes the step of heating with agitation the aqueous composition obtained upon mixing the master mixture and the polymer and/or copolymer suspensions.

10. The method as claimed in claim 8, in which the heating is carried out at a temperature within the range of 60° to 100° C.

11. The method as claimed in claim 9, in which the aqueous composition is heated to a temperature within the range of 60° to 100° C.

12. The method as claimed in claim 8, in which the duration of heating is within the range of 2 to 60 minutes.

13. The method as claimed in claim 9, in which the aqueous composition is heated for from 2 to 60 minutes.

14. The method as claimed in claim 6, in which the mixing is carried out by fluidization.

15. The method as claimed in claim 6, in which the mixing is carried out mechanically.

* * * * *